Patented Apr. 24, 1951

2,550,589

UNITED STATES PATENT OFFICE 2,550,589

LIQUID FLOATING DEVICE

Norman L. Orme, Jr., Asheville, N. C.

Application February 28, 1946, Serial No. 651,006

1 Claim. (Cl. 226—19)

This invention relates to a liquid floating device particularly adapted for floating cream on the surface of a beverage such as coffee.

Among coffee drinkers it has been found the taste of coffee is improved if cream is floated on the surface of the coffee and not mixed or blended with the coffee which occurs when cream is poured directly into the coffee. Heretofore no satisfactory means or method has been found to float cream on the surface of coffee and it is the primary object of this invention to provide a device which will enable coffee drinkers to easily and conveniently float cream on the surface of coffee.

A further object of the invention resides in providing a cup or funnel adapted to receive the cream as it is poured from the pitcher and having at its discharge end means to cause the cream to flow outwardly in the same plane as the surface of the coffee so that it spreads out over the surface of the coffee without blending or mixing therewith.

Another object of the invention resides in providing a device of the above-mentioned character which is simple and durable in construction, efficient in use and inexpensive to manufacture.

Other objects and advantages of the invention will be apparent during the course of the following description.

Figure 1:
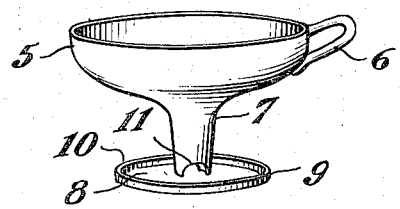
Figure 2:
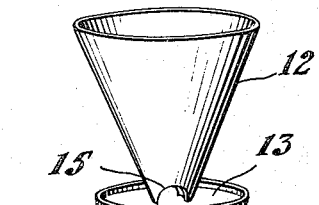
Figure 3:
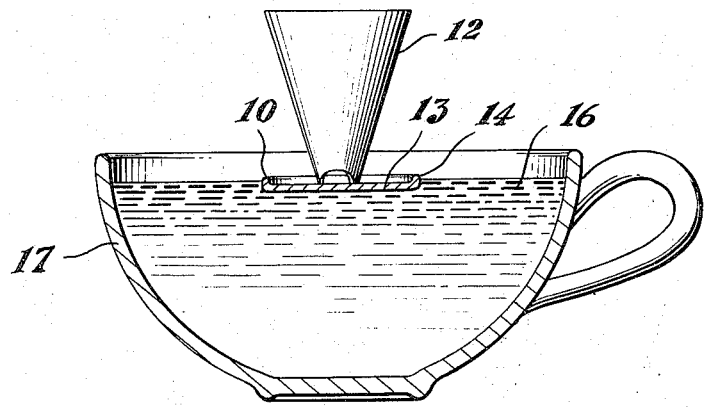

In the accompanying drawing forming a part of this specification and wherein like numerals are employed to designate like parts through the same, Fig. 1 is a perspective view of the device, Fig. 2 is a perspective view of a slightly modified form of the device, and, Fig. 3 is a sectional view of a cup of coffee showing the device in use.

Referring to the drawing the forms of the invention illustrated in Figs. 1 and 2 are substantially the same and only differ in the shape of the body of the funnel. In the form shown in Fig. 1 the funnel shaped body 5 is bowl shape having a handle 6 attached to its outer side wall and a central depending discharge spout 7. Attached to the lower end of the spout 7 is a thin plate 8, preferably of circular shape, having at its marginal edge an upstanding rim 9, the upper edge of the rim being rounded, as at 10. The plate is attached at its center to the spout and extends at right angles to the longitudinal axis of the spout. The spout at its jointure with the plate is provided with spaced openings 11 of a size and shape to permit the cream to flow freely from the spout in a radial direction over the top surface of the plate.

In the form shown in Fig. 2 the funnel shaped body 12 is cone shape having its apex cut-off to provide a discharge end which is attached to the center of a plate 13. The plate is provided with a marginal upstanding rim 14 and in all respects is identical to the plate 8, shown in Fig. 1. The discharge end of the funnel is provided with openings 15 to permit the cream to flow out of the funnel and over the surface of the plate.

Both forms of the device may be constructed of plastic, metal or other suitable material. It is also contemplated to attach a float to the bottom surface of the plates 8 and 13, if desired, whereby the device may float on the surface of the coffee and need not be held in the hand.

As shown in Fig. 3 the funnel shaped body of the device is held in the hand of the user so that the plate 8 or 13 is slightly below the level of the coffee 16 contained within the cup 17. While the plate is below the level of the coffee the rim 9 or 14 protrudes slightly above the coffee level. With the device held in position the cream is poured into the funnel and flows radially from the openings in the lower end over the surface of the plate. The flow of cream beyond the marginal edge of the plate is slightly retarded by the upstanding marginal rim so the cream flows onto the surface of the coffee at a slow speed and gradually floats over the surface in suspended relation to the coffee. The bowl shaped funnel shown in Fig. 1 has certain advantages in that when pouring the cream into the funnel it first strikes the bottom of the bowl and flows gradually into the spout thus eliminating the danger of spattering when the cream strikes the plate.

It is to be understood that the forms of my invention herein shown and described are to be taken as preferred examples of the same and that changes in the shape, size and arrangement of the parts may be made without departing from the spirit of the invention or scope of the subjoined claim.

Having thus described my invention, I claim:

A device for floating a liquid onto the surface of a body of liquid comprising a funnel adapted to receive the liquid to be floated, a disk closing the discharge end of said funnel and extending radially therefrom a substantial distance adapted to be positioned on the surface of the body of liquid slightly below the level thereof, said funnel at its discharge end having lateral openings for discharging the liquid in the funnel onto the upper surface of said disk, and an upstanding marginal flange surrounding said disk of a height sufficient to project slightly above the level of the body of liquid to retard the flow of liquid from the upper surface of said disk onto the surface of the body of liquid.

NORMAN L. ORME, Jr.

REFERENCES CITED

The following references are of record in the file of this patent:

UNITED STATES PATENTS

| Number | Name | Date |
|---|---|---|
| 643,651 | Heylman | Feb. 20, 1900 |
| 654,879 | Dineen | July 31, 1900 |
| 727,781 | Galer | May 12, 1903 |
| 1,507,350 | Franzen | Sept. 2, 1924 |
| 2,324,765 | Clifcorn | July 20, 1943 |

FOREIGN PATENTS

| Number | Country | Date |
|---|---|---|
| 3,952 | Great Britain | Mar. 5, 1891 |
| 24,465 | Great Britain | Nov. 14, 1908 |
| 23,326 | Great Britain | Dec. 1, 1914 |
| 690,095 | France | June 10, 1930 |
| 706,234 | France | Mar. 24, 1931 |
| 346,544 | Italy | Feb. 20, 1937 |